United States Patent Office 3,597,479
Patented Aug. 3, 1971

3,597,479
SUBSTITUTED ANILINO BENZYL ALCOHOLS
Stephen T. Ross and Charles L. Zirkle, Berwyn, Pa., assignors to Smith Kline & French Laboratories, Philadelphia, Pa.
No Drawing. Original application May 5, 1967, Ser. No. 636,259. Divided and this application Feb. 5, 1970, Ser. No. 9,054
Int. Cl. C07c 143/80
U.S. Cl. 260—556      2 Claims

ABSTRACT OF THE DISCLOSURE 2-(substituted anilino)-benzyl alcohols, the substituents being chlorine and N,N-diloweralkylsulfamoyl, are useful as antipyretic and anti-inflammatory agents. The compounds are generally prepared by reduction of the corresponding N-(substituted phenyl)-anthranilic acids.

---

This application is a division of application Ser. No. 636,259 filed May 5, 1967, now U.S. 3,513,199.

This invention relates to novel 2-(substituted anilino)-benzyl alcohols which have useful pharmacodynamic activity. More specifically the compounds of this invention have antipyretic and anti-inflammatory activity as demonstrated in standard animal pharmacological procedures. For example, an antipyretic effect is obtained in yeast-fevered rats at oral doses of 5–50 mg./kg. and in a filter paper granuloma test in rats, significant decrease in granuloma weight is obtained at oral doses of 30–60 mg./kg.

The 2-(substituted anilino)-benzyl alcohols of this invention are represented by the following general structural formula:

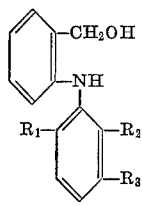

FORMULA I wherein:

$R_1$ and $R_2$ represent hydrogen or chlorine; and
$R_3$ represents N,N-diloweralkylsulfamoyl.

By the term lower alkyl where used herein, groups having from 1 to 4 and preferably from 1 to 2 carbon atoms are indicated.

A preferred compound of this invention is 2-(2',6'-dichloro-3'-dimethylsulfamoyl)-benzyl alcohol.

The compounds of this invention are generally prepared by the following process:

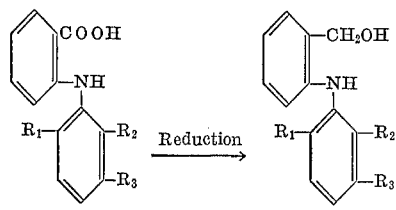

wherein $R_1$, $R_2$ and $R_3$ are as defined above. Thus, as shown, an appropriately substituted anthranilic acid is reduced to give the corresponding benzyl alcohol product. A reducing agent is employed, preferably a bimetallic hydride such as lithium aluminum hydride, or a borohydride reducing agent such as diborane in a nonreactive solvent such as tetrahydrofuran, ether or dioxane. The reduction is advantageously carried out at reflux temperature for from 4 to 12 hours.

The anthranilic acids used as starting materials as described herein are known or are prepared by methods known to the art, for example in British Patent 1,027,060; Belgian Patent 605,304; and U.S. Patent 3,144,387.

The compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate this procedure by the preparation of specific compounds. However this should not be construed as limiting the scope of the invention since appropriate variations in the starting materials will produce other corresponding products set forth in Formula I.

EXAMPLE I

A mixtue of 3.2 g. of lithium aluminum hydride and 100 ml. of tetrahydrofuran is stirred at room temperature for about 15 minutes. A solution of 10.0 g. of N-(3-trifluoromethylphenyl)-anthranilic acid in 60 ml. of tetrahydrofuran is then added, dropwise with stirring. The temperature is then raised to reflux for eight hours. The reaction mixture is cooled to room temperature and a solution of 2 g. of ammonium chloride in 8 ml. of water is added dropwise. The slurry is taken up in 300 ml. of ether, filtered and concentrated to give 2-(3'-trifluoromethylanilino)-benzyl alcohol, B.P. 170–175° C./0.3 mm.

EXAMPLE 2

A mixture of 0.63 g. of lithium aluminum hydride and 30 ml. of dry tetrahydrofuran is heated at 60° C. for 15 minutes, cooled and a solution of 2.08 g. of N-(2,6-dichloro-3-methylphenyl)-anthranilic acid in 20 ml. of tetrahydrofuran is added dropwise. The temperature is gradually raised to reflux for three and one-half hours. The cooled reaction mixture is treated with a saturated solution of ammonium chloride, keeping the temperature at about 10° C., taken up in ether and filtered. The dried filtrate is evaporated to give 2-(2',6'-dichloro-3'-methylanilino)-benzyl alcohol, M.P. 140–142° C.

EXAMPLE 3

By following the general procedures outlined in Examples 1 and 2, equivalent amounts of the following anthranilic acids are reduced to yield the indicated benzyl alcohols:

(a) N-(2,6-dichloro-3-dimethylsulfamoylphenyl)-anthranilic acid yields 2-(2',6'-dichloro-3'-dimethylsulfamoylanilino)-benzyl alcohol; and
(b) N-(2,6-dichlorophenyl)-anthranilic acid yields 2-(2',6'-dichloroanilino)-benzyl alcohol.

What is claimed is:
1. A chemical compound of the following formula:

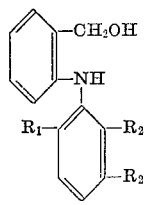

in which:
 $R_1$ and $R_2$ are hydrogen or chlorine; and
 $R_3$ is N,N-diloweralkylsulfamoyl, said lower alkyl moieties having from 1 to 4 carbon atoms.

2. A chemical compound according to claim 1 in which $R_1$ and $R_2$ are chlorine and $R_3$ is dimethylsulfamoyl, being the compound 2-(2',6' - dichloro-3'-dimethylsulfamoylanilino)-benzyl alcohol.

References Cited
UNITED STATES PATENTS 3,369,042   2/1968   Scherrer _____ 260—556B HENRY R. JILES, Primary Examiner S. D. WINTERS, Assistant Examiner U.S. Cl. X.R.
260—397.7, 518; 424—321

PO-1050
(5/69)

UNITED STATES PATENT OFFICE
CERTIFICATE OF CORRECTION

Patent No. 3,597,479          Dated August 3, 1971

Inventor(s) Stephen T. Ross and Charles L. Zirkle

It is certified that error appears in the above-identified patent and that said Letters Patent are hereby corrected as shown below:

Column 3, lines 7 to 11, that portion of the formula reading

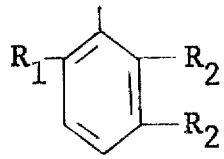 should read 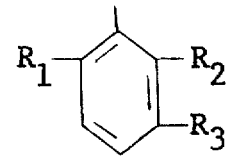

Signed and sealed this 30th day of November 1971.

(SEAL)
Attest:

EDWARD M. FLETCHER, JR.
Attesting Officer

ROBERT GOTTSCHALK
Acting Commissioner of Patents